(12) United States Patent
Arnold et al.

(10) Patent No.: US 10,787,080 B2
(45) Date of Patent: Sep. 29, 2020

(54) METHOD OF AND CONTROL SYSTEM FOR OPERATING A CIRCUIT ARRANGEMENT OF A VEHICLE

(71) Applicant: Bombardier Primove GmbH, Berlin (DE)

(72) Inventors: Rinaldo Arnold, Turgi (CH); Robert Czainski, Szczecin (PL)

(73) Assignee: Bombardier Primove GmbH, Berlin (DE)

( * ) Notice: Subject to any disclaimer, the term of this patent is extended or adjusted under 35 U.S.C. 154(b) by 310 days.

(21) Appl. No.: 15/514,986

(22) PCT Filed: Sep. 28, 2015

(86) PCT No.: PCT/EP2015/072206
§ 371 (c)(1),
(2) Date: Mar. 28, 2017

(87) PCT Pub. No.: WO2016/050667
PCT Pub. Date: Apr. 7, 2016

(65) Prior Publication Data
US 2017/0217315 A1     Aug. 3, 2017

(30) Foreign Application Priority Data

Sep. 29, 2014   (GB) .................................. 1417137.5

(51) Int. Cl.
*H02J 3/00*        (2006.01)
*B60L 5/00*        (2006.01)
(Continued)

(52) U.S. Cl.
CPC ............... *B60L 5/005* (2013.01); *B60L 53/12* (2019.02); *B60M 7/003* (2013.01); *H02J 3/00* (2013.01);
(Continued)

(58) Field of Classification Search
CPC ...... H02J 50/00; H02J 3/00; H02J 3/12; H02J 3/18; H04B 5/00; B60L 5/005
(Continued)

(56) References Cited

U.S. PATENT DOCUMENTS

| 5,207,304 | A | 5/1993 | Lechner et al. | |
| 8,143,746 | B2 * | 3/2012 | Marzetta | H02J 5/005 |
| | | | | 307/104 |

(Continued)

FOREIGN PATENT DOCUMENTS

| WO | 2008131707 A1 | 11/2008 |
| WO | 2014067984 A2 | 5/2014 |

OTHER PUBLICATIONS

Arnold et al.; "Automatic tuning concept for a three-phase inductive power transfer system"; Electric Drives Production Conference (EDPC); 2014; pp. 1-7.

(Continued)

*Primary Examiner* — Adi Amrany
(74) *Attorney, Agent, or Firm* — The Webb Law Firm (57) ABSTRACT

Disclosed is a method of and control system for operating a circuit arrangement, in particular a circuit arrangement of an electric vehicle for inductive power transfer to the vehicle. The circuit arrangement includes at least one phase line with at least one field receiving arrangement and at least one compensating arrangement with a variable reactance, wherein at least one current-dependent cost function is evaluated, wherein the reactance is varied such that the cost function is optimized.

17 Claims, 3 Drawing Sheets

(51) Int. Cl.
| | |
|---|---|
| B60M 7/00 | (2006.01) |
| B60L 53/12 | (2019.01) |
| H02J 3/12 | (2006.01) |
| H02J 3/18 | (2006.01) |
| H02J 5/00 | (2016.01) |

(52) U.S. Cl.
CPC .............. *H02J 3/12* (2013.01); *H02J 3/18* (2013.01); *H02J 5/005* (2013.01); *B60L 2200/26* (2013.01); *B60L 2200/30* (2013.01)

(58) Field of Classification Search
USPC ........................................................ 307/104
See application file for complete search history.

(56) References Cited

U.S. PATENT DOCUMENTS

| | | | | |
|---|---|---|---|---|
| 8,590,682 | B2* | 11/2013 | Meins .................. | B60L 5/005 191/10 |
| 8,827,058 | B2* | 9/2014 | Vollenwyder .......... | B60L 5/005 191/10 |
| 2010/0148750 | A1 | 6/2010 | Derfiora | |
| 2011/0148215 | A1 | 6/2011 | Marzetta et al. | |
| 2012/0055751 | A1* | 3/2012 | Vollenwyder .......... | B60L 5/005 191/10 |
| 2012/0267960 | A1* | 10/2012 | Low ...................... | H02J 50/12 307/104 |
| 2014/0225450 | A1* | 8/2014 | Endo ..................... | H02J 5/005 307/104 |
| 2015/0217646 | A1* | 8/2015 | Safaee .................. | B60L 11/182 307/9.1 |
| 2016/0181853 | A1* | 6/2016 | Yang ..................... | H01F 27/34 320/108 |

OTHER PUBLICATIONS

Arnold et al.; "Modeling of a three-phase inductive power transfer system in a phasor domain for fast simulation"; IEEE 3rd International Energy Transfer for Electric Vehicles Conference (ETEV); 2013; pp. 1-6.

Barnard et al.; "Sliding Transformers for Linear Contactless Power Delivery"; IEEE Transactions on Industrial Electronics; 1997; pp. 774-779; vol. 44:6.

Covic et al.; "Self Tuning Pick-ups for Inductive Power Transfer"; IEEE Power Electronics Specialists Conference; 2008; pp. 3489-3494.

Haerri et al.; "A Plug-In Hybrid "Blue-Angel III" for Vehicle to Grid System with a Wireless Grid Interface"; IEEE Vehicle Power and Propulsion Conference; 2010; pp. 1-5.

Hsu et al.; "A new contactless power pick-up with continuous variable inductor control using magnetic amplifier"; IEEE International Conference on Power System Technology; 2006; pp. 1-8.

Hsu et al.; "A Wireless Power Pickup Based on Directional Tuning Control of Magnetic Amplifier"; IEEE Transactions on Industrial Electronics; 2009; pp. 2771-2781; vol. 56:7.

Hsu et al.; "Determining the variable inductance range for an LCL wireless power pick-up"; IEEE Conference on Electronic Devices and Solid-State Circuits; 2007; pp. 489-492.

Hsu et al.; "Fuzzy based Directional Tuning Controller for a Wireless Power Pick-up"; IEEE Region 10 Conference; 2010; pp. 1-6.

James et al.; "A Variable Inductor Based Tuning Method for ICPT Pickups"; IEEE 7th International Power Engineering Conference; 2005; pp. 1-2.

Keeling et al.; "Unity Power Factor Inductive Power Transfer Pick-up for High Power Applications"; IEEE Transactions on Industrial Electronics; 2010; pp. 1039-1044; vol. 57:2.

Kissin et al.; "Detection of the Tuned Point of a Fixed-Frequency LCL Resonant Power Supply"; IEEE Transactions on Power Electronics; 2009; pp. 1140-1143; vol. 24:4.

Lastowiecki et al.; "Sliding Transformer With Long Magnetic Circuit for Contactless Electrical Energy Delivery to Mobile Receivers"; IEEE Transactions on Industrial Electronics; 2006; pp. 1943-1948; vol. 53:6.

Lechner et al.; "Testing of a Roadway Powered Electric Vehicle Prototype"; Proc. 10th International Electrical Vehicle Symposium; 1990; pp. 959-973.

Madawala et al.; "A Bidirectional Inductive Power Interface for Electric Vehicles in V2G Systems"; IEEE Transactions on Industrial Electronics; 2011; pp. 4789-4796; vol. 58:10.

Meins et al.; "Contactless High Power Supply"; Proc. UEES; 2004; pp. 581-586.

Meins et al.; "Phase control of resonant power supply inverters"; IEEE 11th European Conference on Power Electronics and Applications; 2004; pp. 1-7.

Stielau et al.; "Design of loosely coupled inductive power transfer systems"; IEEE International Conference on Power System Technology; 2000; pp. 85-90.

\* cited by examiner

METHOD OF AND CONTROL SYSTEM FOR OPERATING A CIRCUIT ARRANGEMENT OF A VEHICLE

CROSS-REFERENCE TO RELATED APPLICATIONS

This application is the United States national phase of International Application No. PCT/EP2015/072206 filed Sep. 28, 2015, and claims priority to United Kingdom Patent Application No. 1417137.5 filed Sep. 29, 2014, the disclosures of which are hereby incorporated in their entirety by reference.

BACKGROUND OF THE INVENTION

Field of the Invention

The invention relates to a method of and a control system for operating a circuit arrangement of an electric vehicle, in particular a vehicle-sided circuit arrangement of a system for inductive power transfer to the vehicle. Further, the invention relates to a method of manufacturing a control system for operating a circuit arrangement of a vehicle and to a vehicle.

Description of Related Art

Vehicles, in particular electric vehicles, more particular track-bound vehicles and/or road automobiles, can be operated by electric energy which is transferred by means of an inductive power transfer. Such a vehicle may comprise a circuit arrangement which can be a traction system or a part of a traction system of the vehicle comprising a receiving device adapted to receive an alternating electromagnetic field and to produce an alternating electric current by electromagnetic induction. Furthermore, such a vehicle can comprise a rectifier adapted to convert an alternating current to a direct current. The direct current can be used to charge a traction battery or to operate an electric machine. In the latter case, the direct current can be converted into an alternating current by means of an inverter.

The inductive power transfer is performed using two sets of e.g. three-phase windings. A first set is installed on the ground (primary windings) and can be fed by a wayside power converter (WPC). The second set of windings (secondary windings) is installed on the vehicle. For example, the second set of windings can be attached underneath the vehicle, in the case of trams under some of its waggons. The second set of windings or, generally, the secondary side is often referred to as pick-up-arrangement or receiver. The first set of windings and the second set of windings form a high frequency transformer to transfer electric energy to the vehicle. This can be done in a static state (when there is no movement of the vehicle) and in a dynamic state (when the vehicle moves).

Due to presence of a large clearance between the primary windings and the secondary windings, the operational behaviour of this transformer is different than the behaviour of conventional transformers which have a closed magnetic core with negligible or small air gaps. The large air gap results in smaller mutual inductive coupling and larger leakage inductances.

The leakage inductance usually acts as a series inductance with each secondary winding. To be able to transfer high power levels, it is necessary to use an adequate capacitance in order to compensate the reactance of the inductors at an operating frequency of e.g. 20 kHz to 200 kHz. With respect to the secondary side of the high frequency transformer, the combination of the inductance(s), which can comprise the main or mutual inductance and/or the leakage inductance, and the capacitance(s), which can comprise the compensating capacitance, forms a resonant circuit. A perfect impedance cancellation happens if impedance values of the inductance(s) and the capacitance(s) are chosen such that the natural resonance frequency of the resonant circuit is equal to the operating frequency. Such a resonant circuit is said to be tuned.

Subject to temperature changes and/or aging, a tolerance of a compensating capacitance can increase. In particular, configurations with magnetically permeable materials tend to drift in the relevant parameters. This may result in a detuning of the resonant circuit, wherein the changed resonant frequency does not correspond to the operating frequency any more. Such a detuning deviates the overall performance and power transfer capability of the inductive power transfer system. Also, an impedance of the secondary side reflected to the primary side of the transformer can become capacitive. This can result in a leading current with respect to the voltage in the WPC which is highly unwanted because a leading current eliminates soft switching conditions of semiconductor switches and increases their power losses considerably. Under such operation conditions, a WPC can overheat and turn off which, in turn, interrupts the needed power transfer.

The said detuning can also occur due to positional misalignment of the primary winding structure relative to the secondary winding structure as parameter of the inductive power transfer system vary with varying relative positions.

U.S. Pat. No. 5,207,304 B2 discloses a power pickup system for an electrically powered vehicle. The system comprises a pickup inductor connected to first and second nodes, a power receiving circuit coupled to said first and second nodes, a multiplicity of tuning capacitors, a branch selection means for selecting ones of said multiplicity of tuning capacitors to be coupled to said first and second nodes and for generating a selected signal for each selected tuning capacitor, and a multiplicity of switching circuits, each switching circuit selectively coupling a corresponding tuning capacitor to said first and second nodes. Each switching circuit includes a solid state switch and a trigger circuit coupled to said branch selection means and said solid state switch. Said trigger circuit senses the voltage across said solid state switch and, after receiving one said selection signal from said branch selection means that corresponds to said switching circuit, triggers closure of said solid state switch when said sensed voltage across said solid state switch is approximately zero. Thus, an output current of an inductive coupling system can be controlled by switching a tuning capacitance into or out of the control circuit.

WO 2014/067984 A2 discloses a circuit arrangement, in particular a circuit arrangement of an electric vehicle for inductive power transfer to the vehicle, wherein the circuit arrangement comprises a pick-up arrangement and at least one variable compensating arrangement, wherein the variable compensating arrangement comprises a capacitive element, wherein the variable compensating arrangement further comprises a first switching element and a second switching element, wherein the first switching element and the second switching element are connected in series, wherein the series connection of the first and the second switching element is connected in parallel to the capacitive element of the variable compensating arrangement.

In the publication "R. Arnold, Modeling of a three-phase inductive power transfer system in phasor domain for fast simulation, IEEE 3$^{rd}$ International Energy Transfer for Electric Vehicles Conference (ETEV), Nuremberg, 29-30, Oct. 2013", a physical model of the power transfer is disclosed.

US 2011/0148215 A1 discloses that a wireless power transfer system has a wireless power transmitter and receiver. The transmitter has a transmitting resonant circuit that resonates at a first frequency and a signal generator that generates a signal at a second frequency. The transmitter also has a power detector that measures reflected power at the transmitting resonant circuit, and an auto-tuner that generates transmitter tuning parameters for adjusting the first and second frequencies to reduce reflected power. The receiver has a receiving resonant circuit that resonates at a third frequency based on a receiver tuning parameter. The receiver tuning parameter is generated by a power detector that measures power generated at the receiving resonant circuit, and an auto-tuner that generates the receiver tuning parameter to increase the load power.

It is an object of the present invention to provide a method and a control system for operating a circuit arrangement, in particular of an electric vehicle, more particular a vehicle-sided circuit arrangement of a system for inductive power transfer to the vehicle, by which an inductive power transfer to the vehicle can be optimized even in the case that electrical properties of elements of the circuit arrangement change, wherein the circuit arrangement can be operated with little energy loss and a complexity of controlling the operation of the circuit arrangement is reduced. Further objects of the invention are to provide a method of manufacturing a control system for operating a circuit arrangement and to provide a vehicle comprising such a control system.

SUMMARY OF THE INVENTION

It is a basic idea of the invention to actively vary a reactance of the vehicle-sided circuit arrangement by using an optimization method or approach. By proper controlling a reactance variation, it is possible to compensate a power drop due to changing electrical properties, e.g. as a temperature varies and or a positional misalignment occurs, i.e. detuning. Further, the proposed method should allow keeping the system performance at the same level as a perfectly tuned system, wherein an energy loss due detuning and a complexity of controlling the operation of the circuit arrangement is reduced.

The present invention can be applied to any land vehicle (including but not preferably, any vehicle which is only temporarily on land), in particular track-bound vehicles, such as rail vehicles (e.g. trams), but also to road automobiles, such as individual (private) passenger cars or public transport vehicles (e.g. busses including trolley busses which are also track-bound vehicles).

A method of operating a circuit arrangement is proposed. The circuit arrangement can be a circuit arrangement of an electric vehicle for inductive power transfer to the vehicle.

The circuit arrangement can form a traction system of the electric vehicle or can be a part of the traction system of the electric vehicle. The circuit arrangement comprises at least one phase line with at least one field receiving arrangement. The field receiving arrangement denotes an arrangement of at least one electric element for receiving a magnetic field and for generating an electric alternating current output voltage. This electric element can also be referred to as source element. The field receiving arrangement can, for instance, comprise a coil. In particular, the field receiving arrangement can comprise a secondary winding structure of a transformer, wherein the transformer is used to transfer energy from a route-sided primary winding structure which can be installed in a ground providing a driving surface for the vehicle, to the vehicle. The field receiving arrangement can be installed at a bottom side of the vehicle, e.g. a side facing the driving surface. The field receiving arrangement can provide or be part of a so-called pick-up.

The field receiving arrangement and/or elements of the field receiving arrangement comprise(s) an impedance or provide(s) an impedance. The impedance can be provided by an inductance, in particular a leakage inductance, which is provided at least partly by an air gap between a primary side (primary winding structure) and the secondary side (secondary winding structure) of the aforementioned transformer. Furthermore, the impedance can be provided by a resistance, in particular a resistance of the electric line, e.g. the phase line, and the winding structure of the receiving arrangement. The phase line can denote an electric line by which the field receiving arrangement, e.g. the winding structure, can be connected to another electric element, in particular a rectifier.

Further, the circuit arrangement comprises at least one compensating arrangement with a variable or adjustable reactance. The compensating arrangement can be part of the phase line or be arranged within the phase line. In other words, the field receiving arrangement can be connected to the compensating arrangement by at least a part of the phase line, wherein the compensating arrangement can be connected to another electric element, in particular the rectifier, by a remaining part of the phase line.

The compensating arrangement is used to tune the circuit arrangement. In particular, the compensating arrangement provides an adjustable reactance. Thus, the compensating arrangement provides an adjustable impedance.

A resonant frequency of the circuit arrangement can be adapted to an operating frequency of the aforementioned transformer, e.g. an operating frequency in the range of 20 kHz to 200 kHz by varying or adjusting the reactance. Thus, changing electric properties of electric elements of the circuit arrangement can be compensated for.

The compensating arrangement can comprise or be provided by at least one electric element, in particular a capacitive element with a variable capacitance. Also, the compensating arrangement can be provided by an arrangement of multiple electric elements.

The compensating arrangement can also be provided by or comprise an inductive element, in particular an inductive element with a variable inductance. The inductive element can be part of a so called magnetic amplifier which is e.g. described in the publication "Hsu et. al., A new contactless power pickup with continuous variable inductor control using magnetic amplifier, IEEE International Conference on Power System Technology ICSPST, Chongqing, 2006".

Also, the compensating arrangement can be provided by a main compensation capacitor and additional binary weighted capacitors which is e.g. disclosed in the publication "Kissin et. al., Detection of Tuned Point of a Fixed-Frequency LCL Resonant Power Supply, IEEE Transactions on Power Electronics, TIE, vol. 24, no. 4, April 2009".

The design of the compensating arrangement, however, is not restricted to the aforementioned examples. The skilled person is aware of any alternative embodiments of a compensating arrangement with a variable or adjustable reactance.

According to the invention, at least one current-dependent cost function is evaluated. The current-dependent cost function can denote a function which comprises or is equal to at least one term which represents at least one characteristic of the at least one phase current or which depends on or is equal to the phase current or its characteristic, e.g. the amplitude of the phase current. The phase current can e.g. be estimated or measured, e.g. by a current sensor. Exemplary cost functions will be described later in more detail.

The cost function can denote a mathematical function which provides a cost function value at a selected point in time. Further, the reactance is varied such that the cost function, in particular a cost function value, is optimized, e.g. such that the cost function value is minimized or maximized.

Preferably, the cost function is chosen such that in case of a maximized cost function value, a maximal phase current is provided in the phase line, in particular a phase current with a maximal amplitude or a phase current with a maximal root mean square (RMS) value.

The cost function is therefore part of an optimization problem, wherein the reactance provides an adjustable parameter, which can also be referred to as optimization parameter, of the optimization problem.

Thus, controlling the operation of the circuit arrangement is performed by determining an optimal reactance via solving an optimization approach with a current-dependent cost function.

This advantageously allows a fast and precise determination of a reactance which, in turn, optimizes the transfer of active power, while the transfer of reactive power is minimized.

Further, the circuit arrangement comprises three phase lines, wherein each phase line comprises at least one field receiving arrangement and at least one compensating arrangement with a variable reactance. The field receiving arrangement and the compensating arrangement can be designed according to one of the previously described embodiments.

Further, the at least one current-dependent cost function is evaluated, wherein the current-dependent cost function is a function which comprises at least one term per phase. Each of the terms can represent at least one characteristic of the respective phase current or wherein each of the terms depends on or is equal to the respective phase current or its characteristic, e.g. the amplitude of the respective phase current. The phase currents can e.g. be estimated or measured, e.g. by current sensors.

Further, the reactances of each of the compensating arrangements are varied such that the cost function optimized, e.g. minimized or maximized.

Preferably, the cost function is chosen such that in case of a maximized cost function value, maximal phase currents are provided, e.g. maximal amplitudes or maximal RMS values. Alternatively, a maximal sum of the phase currents can be provided, in particular a sum of the amplitudes of the respective phase currents.

The cost function is therefore part of an optimization problem, wherein the reactances provide adjustable parameters, which can also be referred to as optimization parameters, of the optimization problem. Alternatively, at least one reference input per phase line, preferably one single reference input per phase line, can be varied such that the cost function optimized. In this case, the reference input values provide the optimization parameters.

In the case of three phase lines, the optimization problem can be considered as a multi-dimensional, in particular a three-dimensional, optimization problem. The optimization parameters can be varied simultaneously. In this case, a multi-dimensional optimization method can be used to determine optimal optimization parameters.

Alternatively, the optimization parameters can be varied sequentially. In this case, one selected optimization parameter, in particular one single optimization parameter per phase line, can be varied for a predetermined number of times or until an optimized cost function value is determined. The remaining optimization parameters can be kept constant. After the variation of the selected optimization parameter, one of the remaining optimization parameters can be varied for a predetermined number of times or until an optimized cost function value is determined. The remaining cost function values can be kept constant. This can be repeated until each optimization parameters of the set of optimization parameters has been varied or has been considered.

This advantageously allows an effective operation of a three-phase system, wherein the inductive power transfer is optimized.

In another embodiment, at least one reference input, in particular exactly one reference input, of a compensating arrangement is varied such that the cost function is optimized, e.g. minimized or maximized. In other words, the reactance can be varied by varying the at least one reference input, in particular by varying exactly one reference input.

The reference input depends on the design of the compensating arrangement. Depending on the reference input, a predetermined reactance will be provided or set by the compensating arrangement. The reference input can e.g. be a voltage, a current or any other kind of parameter. If the reference input is varied, the reactance of the compensating arrangement is varied. As will be explained later, the reference input can also be a phase angle or phase angle delay of the phase current.

Thus, an optimal reference input is determined via the optimization approach which advantageously allows a simple implementation of the proposed method.

In another embodiment, the current-dependent cost function depends on an amplitude of at least one phase current. It is possible that the cost function or the phase-specific term is equal to the amplitude of the phase current or proportional to the amplitude of the phase current. This can mean that the cost function is equal to the maximal absolute value of an alternating phase current, e.g. during one period of the phase current, in particular in a steady state of the circuit arrangement.

It has been observed in measurements and simulations that in case of a maximal absolute value of the phase current, only active power is transferred from the primary side to the secondary side. This, means that a maximal active power is transferred, while the reactive power due to the air gap is minimized. Visually spoken, the circuit arrangement, if transformed from the secondary side to the primary side, e.g. in an equivalent circuit, can be modelled as an exclusively real-valued circuit arrangement.

The proposed cost function advantageously allows a fast and precise adjustment of the reactance which, in turn, optimizes the transfer of active power, while the transfer of reactive power is minimized.

In an alternative embodiment, the circuit arrangement comprises at least one rectifier for rectifying an alternating output voltage generated by the field receiving arrangement. The rectifier can be connected in series to the series connection of the field receiving arrangement and the compensating arrangement. Via the rectifier, the AC (alternating current) phase current can be rectified into a rectified phase current which is a DC (direct current) current.

The current-dependent cost function depends on the rectified phase current. The rectified phase current can be calculated, e.g. model-based, or measured, e.g. by a current sensor.

In particular, the current-dependent cost function can be equal to or proportional to the rectified phase current, in particular an amplitude or an absolute value of the amplitude of the rectified phase current.

Alternatively, the current-dependent cost function depends on an output power of the rectifier. The output power can be a power provided at DC terminals of the rectifier. The output power of the rectifier can e.g. be calculated as the product of a DC output voltage of the rectifier and the DC output current of the rectifier, wherein the DC output current is equal to or depends on the rectified phase current. The output voltage can be calculated, e.g. model-based, or measured, e.g. by a voltage sensor.

Alternatively, the output power of the rectifier can be calculated as the product of the squared DC output current and a load resistance, wherein the load resistance represents the resistance or impedance of the electrical network connected to the DC output side of the rectifier. The load resistance can e.g. be determined based on an electric model of the electrical network.

Both, the output power and the rectified phase current depend on the phase current or the phase currents. Hence, the proposed cost functions advantageously allow a fast and precise adjustment of the reactance which, in turn, optimizes the transfer of active power, while the transfer of reactive power is minimized. In case of the output power being calculated depending on the squared rectified phase current, the cost function is more sensitive regarding changes in the phase current, i.e. changes in the phase current will cause high changes in the cost function. This allows a faster and more reliable optimization.

In another embodiment, an optimal reactance is determined by a one-dimensional optimization method or approach. In this case, only one optimization parameter, e.g. the aforementioned reactance or the aforementioned single reference input, is varied in order to determine an optimal cost function value.

If the cost function depends on at least two adjustable optimization parameters, e.g. at least two reactances or at least two input reference inputs, it is possible to vary or adjust only one selected optimization parameter at a time and to keep the remaining optimization parameter constant. This will be explained later in more detail. After having determined the optimal value of the selected optimization parameter which optimizes the cost function, the selected optimization parameter can be kept constant while the remaining optimization parameter or one of the remaining optimization parameters is varied in order to optimize the cost function value. This can be repeated unit all optimization parameters have been varied or at least considered.

This advantageously allows a fast and easy-to-implement determination of an optimal optimization parameter.

In a preferred embodiment, the one-dimensional optimization method is a hill-climbing optimization method. The hill-climbing optimization method is known to the skilled person. It is an iterative algorithm that starts with an arbitrary solution to a problem, e.g. an arbitrary value of the selected optimization parameter. Then, the selected optimization parameter is incrementally changed. If the change produces a better solution, e.g. a higher cost function value, another incremental change is made to the new optimization parameter. This is repeated until no further improvements can be found.

As the hill-climbing approach is a very simple approach, it advantageously results in an easy-to-implement method.

In another embodiment, the current-dependent cost function depends on a sum of the amplitudes of all phase currents, in particular on a sum of the maximal absolute values of the amplitudes of the phase currents, e.g. during one period of the respective phase current. In particular, the cost function can be equal to or proportional to the sum of all phase currents.

It has been observed in measurements and simulations of a three phase system that in case of a maximized sum of all maximal absolute values of the phase currents, only active power is transferred from the primary side to the secondary side. This, in turn means, that a maximal active power is transferred, while the reactive power due to the air gap is minimized. Visually spoken, the circuit arrangement, if transformed from the secondary side to the primary side, e.g. in an equivalent circuit, can be modelled as an exclusively real-valued circuit arrangement.

The circuit arrangement can comprise a three phase rectifier for rectifying all phase currents. The rectifier provides a rectified output current and a rectified output voltage. In this case, the current-dependent cost function can also depend on the rectified phase current, wherein said rectified phase current depends on the sum of all three phase currents.

As described previously, the current-dependent cost function can be equal to or proportional to the rectified phase current, in particular an amplitude or an absolute value of the amplitude of the rectified phase current. Alternatively, the current-dependent cost function depends on an output power of the rectifier.

As also described previously, the proposed cost functions advantageously allow a fast and precise adjustment of the reactance which, in turn, optimizes the transfer of active power, while the transfer of reactive power is minimized. In case of the output power being calculated depending on the squared rectified phase current, the cost function is more sensitive regarding changes in the phase current, i.e. changes in the phase current will cause high changes in the cost function. This allows a faster and more reliable optimization.

In another embodiment, the reactances of the phase lines are varied sequentially. This has been explained previously. This means that only one reactance, e.g. a reactance of one phase line, is varied while the remaining reactances, e.g. of the remaining phase lines, are kept constant. This can be repeated until each reactance has been varied or considered at least one time. The reactances can e.g. be varied by varying the previously described input reference value.

In another embodiment, the reactance of one phase line is varied for a predetermined number of times. It is, for instance, possible to vary the reactance 10 times. This means that the reactance is changed 10 times. This advantageously provides a good trade-off between a required computational time and the desired determination of an optimal reactance.

Alternatively, the reactance of one phase line can be varied until an optimal value of the cost function is found. It is, of course, also possible to terminate the variation of the reactance if a variation of the cost function value is smaller than a predetermined threshold value.

In another embodiment, the reactance of a phase line is varied after a predetermined time period after the preceding variation of a reactance. This can mean that the reactance is only varied if the predetermined time period has passed since the end of the preceding variation of a reactance.

The predetermined time period can be chosen longer than a maximal time constant of the circuit arrangement, wherein the time constant arises from inner dynamics of the electric circuit. This can mean that the time period can be chosen such that the circuit arrangement has reached a steady state after the preceding variation. The time period can e.g. be chosen longer than 3 ms or 5 ms. Thus, the reactance is only varied if the circuit arrangement has reached a steady state and a transient behavior does not affect the optimization problem which may result in a non-optimal result and/or in a longer time required for optimization.

In another embodiment, a compensating arrangement comprises a capacitive element, wherein the compensating arrangement further comprises a first switching element and a second switching element, wherein the first switching element and the second switching element are connected in series, wherein the series connection of the first and the second switching element is connected in parallel to the capacitive element of the variable compensating arrangement.

Such a circuit arrangement has been described in the WO 2014/067984 A2 which is hereby fully incorporated by reference.

Further, the variable compensating arrangement can be connected in series to the field receiving arrangement.

Further, the circuit arrangement can comprise at least one static compensating element, wherein the field receiving arrangement, the static compensating element and the variable compensating arrangement are connected in series.

Further, the first switching element and/or the second switching element can be (a) semiconductor element(s).

Further, the first switching element can have a conducting direction and the second switching element can have a conducting direction, wherein the first and the second switching element are connected such that the conducting direction of the first switching element is opposite to the conducting direction of the second switching element.

Further, a first diode can be connected anti-parallel to the first switching element and a second diode can be connected anti-parallel to the second switching element.

Further, the circuit arrangement can comprise a least one current sensing means for sensing a phase current of the circuit arrangement, wherein switching times of the first and the second switching element are controllable depending on the phase current.

Further, the circuit arrangement can comprise a least one voltage sensing means for sensing a voltage across the capacitive element of the variable compensating arrangement, wherein the switching times of the first and the second switching element are controllable depending on the voltage.

Further, the circuit arrangement can comprise a control unit which is adapted to control an operating mode of the first and the second switching element.

Further, the circuit arrangement can comprise three phases, wherein each of the phases comprises at least one variable compensating arrangement.

In another embodiment, the reference input is a current phase angle delay, wherein the current phase angle delay defines switching times of the switching elements or wherein said switching times can be determined depending on the phase angle delay. This has also been described in WO 2014/067984 A2. The current phase angle delay can be a phase angle relative to a reference phase angle of the phase current at a zero crossing of the phase current, wherein the phase current has a reference phase angle at the next zero crossing.

Within one period of the phase current during which the current phase angle changes from 0° to 360°, it is possible that the second switching element changes from a conducting state to a non-conducting state before the first zero crossing if the difference between the phase angle at the first zero crossing and the actual phase angle of the phase current is equal to the desired current phase angle delay. The first switching element can change from a non-conducting state to a conducting state at the first zero crossing. After the first zero crossing, the first switching element can change from the conducting state to the non-conducting state if the difference between the phase angle at the second zero crossing and the actual phase angle of the phase current is equal to the desired current phase angle delay. The second switching element can change from the non-conducting state to the conducting state at the second zero crossing.

The phase angle delay can e.g. be chosen from an interval of 0° to 90°.

This advantageously allows a very effective control of the reactance via the proposed optimization approach.

Further proposed is a control system for operating a circuit arrangement, in particular a circuit arrangement of an electric vehicle for inductive power transfer to the vehicle.

Referring to the previously described embodiments, the the circuit arrangement comprises at least one phase line with at least one field receiving arrangement and at least one compensating arrangement with a variable reactance.

The control system comprises at least one control unit and at least one means for determining at least one parameter depending on a phase current, e.g. a current sensor.

According to the invention, at least one current-dependent cost function is evaluatable, wherein the reactance is variable such that the cost function is optimized. The at least one current-dependent cost function can be evaluated by the control unit. Further, the reactance can be varied by the control unit, in particular by varying at least one reference input of the compensating arrangement.

The proposed control system can be designed such that a method according to one of the embodiments described in this disclosure can be performed by the control system.

Further described is a method of manufacturing a control system for operating a circuit arrangement, in particular a circuit arrangement of an electric vehicle for inductive power transfer to the vehicle.

The circuit arrangement comprises at least one phase line with at least one field receiving arrangement and at least one compensating arrangement with a variable reactance.

Further at least one control unit and a least one means for determining at least one parameter depending on a phase current, e.g. a current sensor, is provided. The parameter which depends on the phase current can be the phase current. As outlined before, the parameter can also be an output power of a rectifier or a rectified phase current at the DC terminals of the rectifier.

According to the invention, the control unit and the at least one means for determining at least one parameter depending on the phase current are provided such that at least one current-dependent cost function is evaluatable, wherein the reactance is variable such that the cost function maximized.

The proposed method advantageously allows manufacturing a control system according to the previously described embodiment.

Further described is a vehicle, in particular an electric vehicle, comprising the control system according to the previously described embodiment. The vehicle can comprise the previously described circuit arrangement.

DETAILED DESCRIPTION

Figure 1:
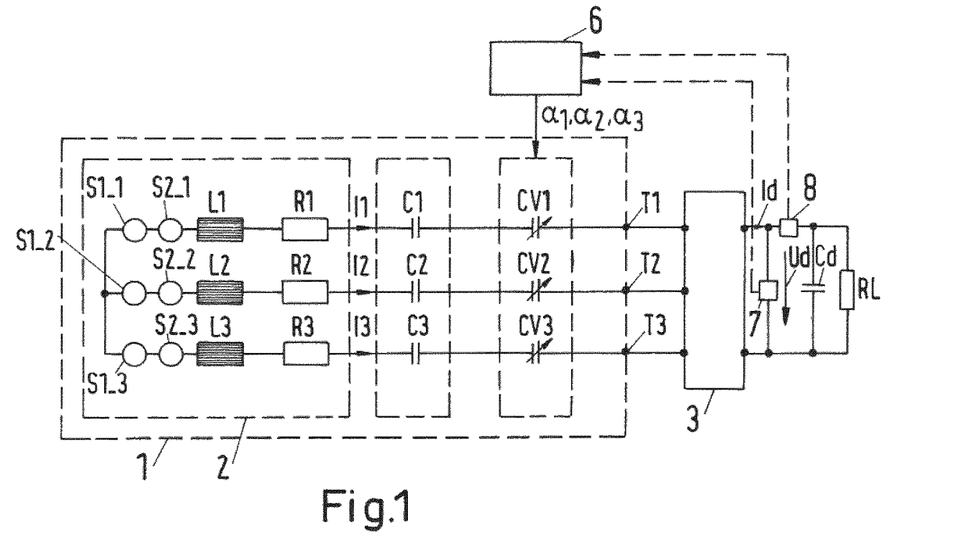
FIG. 1 a schematic circuit diagram of a control system.

FIG. 1 shows a schematic circuit diagram of a control system for operating a vehicle-sided circuit arrangement 1 of a system for inductive power transfer to a vehicle.

The circuit arrangement 1 comprises a field receiving arrangement 2, static compensating elements C1, C2, C3 and variable compensating arrangements CV1, CV2, CV3. The circuit arrangement 1 comprises three phases. It is shown that the field receiving arrangement 2 comprises a first set of source elements S1_1, S1_2, S1_3, a second set of source elements S2_1, S2_2, S2_3, inductances L1, L2, L3 and phase resistances R1, R2, R3.

In each phase, the respective source element S1_1, S1_2, S1_3 of the first set of source elements S1_1, S1_2, S1_3, the respective source element S2_1, S2_2, S2_3 of the second set of source elements S2_1, S2_2, S2_3, the respective leakage inductance L1, L2, L3 and the respective phase resistance R1, R2, R3 are connected in series.

The source elements S1_1, S1_2, S1_3 of the first set of source elements S1_1, S1_2, S1_3 represent a voltage source of a voltage induced by the power transfer field in a field receiving element of the respective phase, e.g. a winding structure or coil.

The source elements S2_1, S2_2, S2_3 of the second set of source elements S2_1, S2_2, S2_3 represent a voltage source of a voltage induced by an alternating electromagnetic field which is generated by the receiving elements of the remaining phase lines during reception of the power transfer field. Inductances L1, L2, L3 represent a self-inductance of the respective phase line. Resistances R1, R2, R3 represent a resistance of the respective phase line.

The field receiving arrangement 2 generates alternating phase currents I1, I2, I3 during an inductive power transfer.

Each phase further comprises one static compensating element C1, C2, C3 which is provided by capacitor with a predetermined capacitance respectively. These static compensating elements C1, C2, C3 are used to tune the circuit arrangement 1 such that the resonant frequencies provided by the series connections of the inductances L1, L2, L3, the phase resistances R1, R2, R3 and the static compensating elements C1, C2, C3 each correspond to an operating frequency of the inductive power transfer which can e.g. be 20 kHz or equal to a selected frequency within the interval of 20 kHz to 200 kHz.

Figure 3:
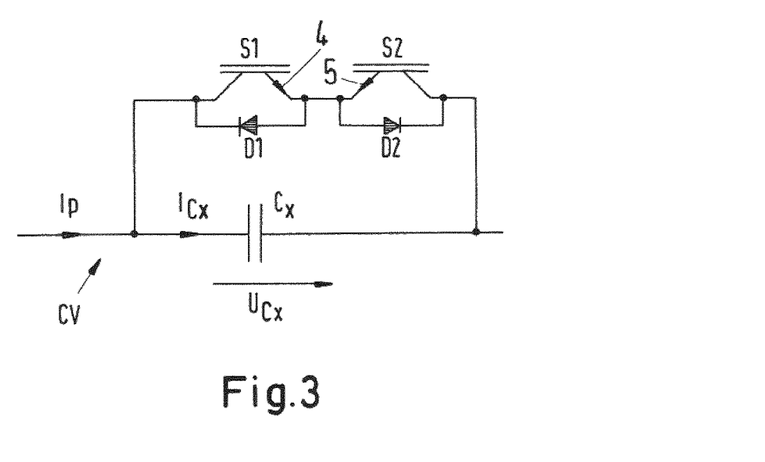
FIG. 3 a schematic diagram of a variable compensating arrangement.

Each phase further comprises one compensating arrangement CV1, CV2, CV3. An exemplary design of a compensating arrangement CV is shown in FIG. 3 in more detail.

In each phase, the respective elements of the field receiving arrangement 2 are connected in series to the respective static compensating element C1, C2, C3 and the respective variable compensating arrangement CV1, CV2, CV3.

Also shown is a rectifier 3, wherein AC terminals of the rectifier 3 are connected to output terminals T1, T2, T3 of the circuit arrangement 1. The rectifier 3 can e.g. be designed as a diode rectifier. An electrical network comprising a parallel connection of an intermediate circuit capacitor Cd and a load resistor RL is connected to DC terminals of the rectifier 3.

Further shown is the intermediate circuit capacitor Cd and the load resistor RL which represent a resistance of the electrical network connected to DC terminals of the rectifier 3.

Further indicated is a rectified phase current Id which is a DC current and a rectified voltage Ud which is a DC voltage.

Further shown is a control unit 6, a voltage sensor 7 for measuring the rectified voltage Ud and a current sensor 8 for measuring the rectified phase current Id.

At a point in time k, the control unit 6 evaluates a current-dependent cost function $$J(k)=Ud(k) \times Id(k) \qquad \text{formula 1.}$$

The time variable k denotes the short of k×Ts, wherein Ts denotes a predetermined sampling time.

Alternatively, the current-dependent cost function could be given by $$J(k)=|I1(k)|+|I2(k)|+|I3(k)|=\|Is(k)\| \qquad \text{formula 2,}$$

wherein |I1(k)| denotes an amplitude of the respective phase current I1 at the point in time k and ||Is(k)|| the norm of Is(k). It is also possible to express the current Is as a column vector, wherein the entries of the column vector are the complex-valued phase currents I1, I2, I3. In this case, ||Is(k)|| can denote the 1-norm of the column vector.

The phase currents I1, I2, I3 can be measured by current sensors (not shown). The amplitude can denote the peak value or maximal absolute value during one period of the phase current I1, I2, I3 around the actual point in time k.

Alternatively, the current-dependent cost function could be given by $$J(k)=|Id(k)|^2 \times RL = (1/pi \times \|Is(k)\|)^2 \times RL \qquad \text{formula 3.}$$

Alternatively, the current-dependent cost function could be given by $$J(k)=Id(k) \qquad \text{formula 4.}$$

Further indicated are phase angle delays α1, α2, α3, wherein the phase angle delays α1, α2, α3 define switching times of the first and the second switching element S1, S2 (see FIG. 3). These phase angle delays α1, α2, α3 provide reference inputs for the compensating arrangements CV1, CV2, CV3 in each phase line, respectively. By varying the phase angle delays α1, α2, α3, the reactance of the respective compensating arrangement CV1, CV2, CV3 can be varied.

The control unit 6 can change the phase angle delays α1, α2, α3 and provide the phase angle delay α1, α2, α3 to another control unit for controlling the switching operation of the switching elements S1, S2. Alternatively, the control unit can also control the switching operation of the switching elements S1, S2 based on the phase angle delay α1, α2, α3.

However, the phase angle delays α1, α2, α3 are only exemplary reference inputs. The skilled person is aware of any alternative reference input of possible compensating arrangements by which a reactance of said arrangements can be varied.

For each phase, an overall or resulting impedance of the circuit arrangement 1 is given by the series connection of the respective inductance L1, L2, L3, the respective phase resistance R1, R2, R3, the respective static compensating element C1, C2, C3 and the respective variable compensating arrangement CV1, CV2, CV3. As a capacitance and thus a reactance of the variable compensating arrangements CV1, CV2, CV3 can be varied, the resulting or overall impedance of each phase of the circuit arrangement 1 can be varied, too. This, in turn, allows compensating a change of the impedances of the inductance L1, L2, L3, the phase resistance R1, R2, R3 and/or the static compensating element C1, C2, C3. By tuning the impedance of each phase of the circuit arrangement 1, an energy transfer during the aforementioned inductive power transfer using the proposed circuit arrangement 1 can be optimized.

In particular, the effect of a variation of the parameters of the circuit arrangement due to temperature changes and/or positional misalignment between a primary winding structure and a secondary winding structure on the inductive power transfer can be compensated for.

Figure 2:
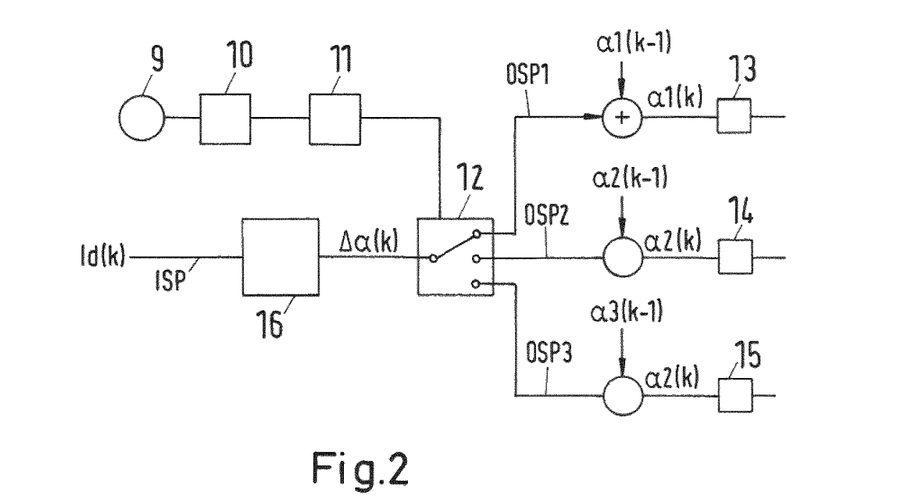
FIG. 2 a schematic flow diagram of a method according to the invention.

FIG. 2 shows a schematic flow diagram of a method according to the invention. Shown is a clock unit 9 which provides a clock signal. The clock signal is normalized by a division unit 10 such that a counter unit 11 increments a counter variable after a predetermined period of time has passed after the preceding increment.

The counter variable is provided to a switching unit 12, wherein the switching unit 12 connects an input signal path ISP to either a first output signal path OSP1, a second output signal path OSP2 or a third output signal path OSP3.

Within the input signal path ISP, a delay change $\Delta\alpha(k)$ is calculated.

If the input signal path ISP is connected to the first output signal path OSP1, a varied phase angle delay $\alpha 1(k)$ for the switching elements S1, S2 of the compensating arrangement CV1 in the first phase line is calculated by a summing the actual phase angle delay $\alpha 1(k-1)$ and the delay change $\Delta\alpha(k)$. The resulting value is held constant by a holding element 13.

If the input signal path ISP is connected to the second output signal path OSP2, a varied phase angle delay $\alpha 2(k)$ for the switching elements S1, S2 of the compensating arrangement CV2 in the second phase line is calculated by a summing the actual phase angle delay $\alpha 2(k-1)$ and the delay change $\Delta\alpha(k)$. The resulting value is held constant by a holding element 14.

If the input signal path ISP is connected to the third output signal path OSP3, a varied phase angle delay $\alpha 3(k)$ for the switching elements S1, S2 of the compensating arrangement CV3 in the third phase line is calculated by a summing the actual phase angle delay $\alpha 3(k-1)$ and the delay change $\Delta\alpha(k)$. The resulting value is held constant by a holding element 15.

The switching unit 12 switches sequentially between the output signal paths OSP1, OSP2, OSP3, wherein a switching operation is performed if the counter variable is equal to a predetermined number, e.g. equal to 10. If a switching operation is performed, the counter value is reset to zero.

The actual cost function value, in particular the rectified phase current Id(k), is provided to the input signal path ISP. An evaluation unit 16 which can be part of the control unit 6 or be provided by the control unit 6 (see FIG. 1) then calculates the delay change $\Delta\alpha(k)$ by a hill-climbing optimization approach. It is, for instance possible, that the evaluation unit 6 evaluates if the rectified phase current Id(k) at the actual point in time k is higher than the phase current Id(k−1) at the preceding point in time k−1. If the actual phase current Id(k) is higher, a weighting factor wf can be determined as +1 and the delay change $\Delta\alpha(k)$ can be determined as $$\Delta\alpha(k)=wf\times\Delta\alpha(k-1) \quad\text{formula 5.}$$

If the actual phase current Id(k) is lower, a weighting factor wf can be determined as −1. This means that if the delay change $\Delta\alpha(k-1)$ at the preceding point in time was positive and the actual value of the cost function, e.g. the actual value of the phase current, has increased, the delay change $\Delta\alpha(k)$ at the actual point in time will be increased again. Correspondingly, if the delay change $\Delta\alpha(k-1)$ at the preceding point in time was negative and the actual value of the cost function has increased, the delay change $\Delta\alpha(k)$ at the actual point in time will be decreased again. Correspondingly, if the delay change $\Delta\alpha(k-1)$ at the preceding point in time was negative and the actual value of the cost function has decreased, the delay change $\Delta\alpha(k)$ at the actual point in time will be increased. Correspondingly, if the delay change $\Delta\alpha(k-1)$ at the preceding point in time was negative and the actual value of the cost function has increased, the delay change $\Delta\alpha(k)$ at the actual point in time will be decreased.

FIG. 3 shows a schematic diagram of a variable compensating arrangement CV. The variable compensating arrangement CV comprises a capacitive element Cx, a first switching element S1 and a second switching element S2. Furthermore, the variable compensating arrangement CV comprises a first diode D1 and a second diode D2. The first diode D1 is connected anti-parallel to the first switching element S1. Correspondingly, the second diode D2 is connected anti-parallel to the second switching element S2. The switching elements S1, S2 can be semiconductor switches. The series connection of the first and the second switching element S1, S2 is connected in parallel to the capacitive element Cx of the variable compensating arrangement CV. It is shown that a conducting direction of the first switching element S1, which is symbolized by an arrow 4, is opposite to a conducting direction of the second switching element S2, which is symbolized by arrow 5. By controlling the switching operation of the switching elements S1, S2, in particular switching times, a reactance of the variable compensating arrangement CV can be varied, e.g. tuned to a desired reactance. This is described in WO 2014/067984 A2.

Figure 4:
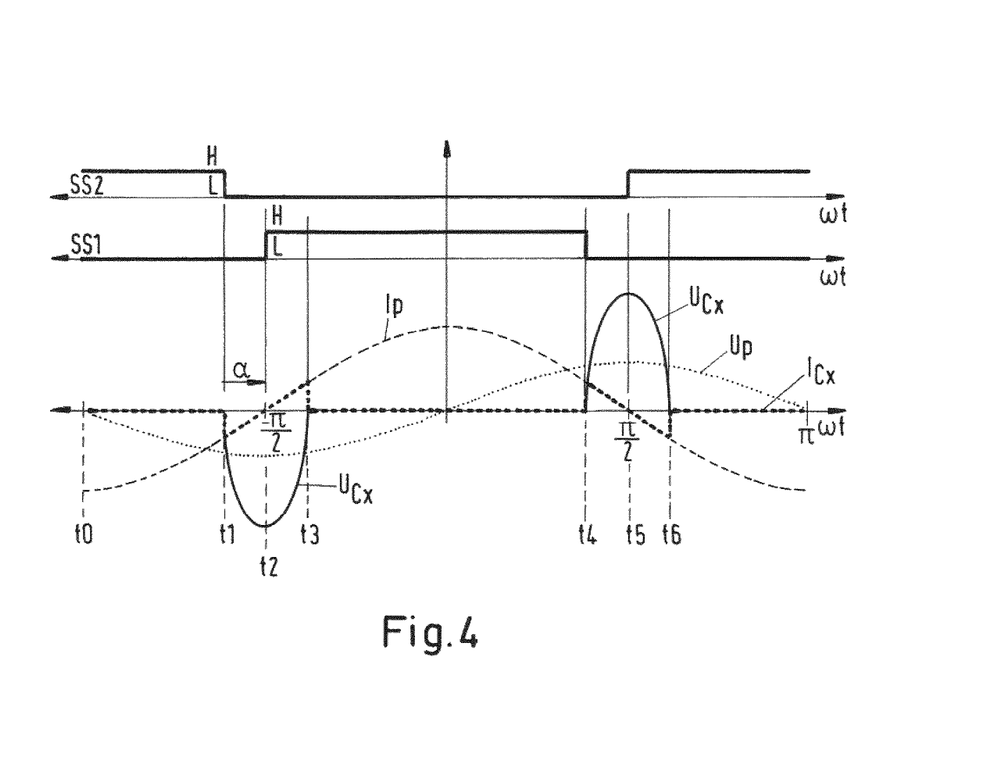
FIG. 4 an exemplary time course of a phase current, a phase voltage and switching times of the switching elements, and FIG. 5 a schematic flow diagram of a hill-climbing approach.

In FIG. 4 shows an exemplary time course of switching signals SS1, SS2 of the first and the second switching element S1, S2 (see FIG. 3), a phase current Ip, a voltage $U_{Cx}$ falling across a capacitive element Cx of the variable compensating arrangement CV (see FIG. 2), a current $I_{Cx}$ flowing through the capacitive element Cx and a phase voltage Up are shown. The switching signals SS1, SS2 can be high level signals H or low level signals L. If a high level signal H is applied, the switching element S1, S2 is operated in a second operating mode (closed state) and if a low level signal L is applied, the switching element S1, S2 is operated in a first operating mode (opened state). The switching signals SS1, SS2 can be gate signals of semiconductor switches which provide the first and the second switching element S1, S2. At an initial point in time t0, a high level signal H is applied to the second switching element S2. At the same time, a low level signal L is applied to the first switching element S1. At this initial point in time t0, the phase current Ip is negative. Referring to FIG. 3, the phase current Ip flows through the second switching element S2 and the first diode D1. The voltage $U_{Cx}$ falling across the capacitive element Cx is zero. At a first switching instant t1 the switching signal SS2 of the second switching element S2 is turned to a low level signal L. Thus, an operating mode of the second switching element is changed from a second operating mode (closed state) to a first operating mode (opened state). Now, the switch arrangement, i.e. the series connection of the first and the second switching element S1, S2, blocks the phase current Ip which consequently charges the capacitive element Cx. Thus, an absolute value of the voltage $U_{Cx}$ increases.

At a second switching instant t2, the first switching signal SS1 of the first switching element S1 is turned to a high level signal H. The second switching instant t2 corresponds to a zero crossing instant of the phase current Ip. The time axis in FIG. 3 shows a phase angle ωt and the second switching instant t2 corresponds to a phase angle of −π/2 with reference to the phase angle of the phase voltage Up. A time difference between the first switching instant t1 and the second switching instant t2 is expressed in terms of a phase angle delay α. The phase angle delay α can be chosen such that a predetermined maximum absolute value of the voltage $U_{Cx}$ during the charging of the capacitive element Cx is achieved. After the second switching instant t2, the capacitive element Cx is discharged and the absolute value of the voltage $U_{Cx}$ decreases, wherein the current $I_{Cx}$ resulting from the discharge provides the phase current Ip.

At a third point in time t3, the capacitive element Cx is completely discharged and the phase current Ip changes its current path and flows through the first switching element S1 and the second diode D2. At a third switching instant t4, the first switching signal SS1 is turned from a high level signal H to a low level signal L. Thus, the current flow through the series connection of the switching elements S1, S2 is blocked and the phase current consequently corresponds to the current $I_{Cx}$ charging the capacitive element Cx. At a fourth switching instant t5, the second switching signal SS2 of the second switching element S2 is turned from a low level signal L to a high level signal H. Again, the capacitive element Cx discharges, wherein the current $I_{Cx}$ resulting from the discharge provides the phase current Ip. A time difference between the third and the fourth switching instant t4, t5 can be expressed by the phase angle delay α. At a sixth point in time t6, the capacitive element Cx is completely discharged and the phase current Ip changes its current path and now flows through the second switching element S2 and the first diode D1.

A control unit 6 (see FIG. 1) can be used to synchronize the switching instances t1, t2, t4, t5 with the phase current Ip flowing through the circuit arrangement 1 (see FIG. 1). The control unit can e.g. generate gate pulses or gate signals which can be equal to the switching signals SS1, SS2 shown in FIG. 3. In an inactive operation of the variable compensating arrangement CV1, CV2, CV3, CV (see FIG. 1 or FIG. 3) the switching elements S1, S2 will be closed and the series connection of the switching elements S1, S2 acts as a bypass for the phase current Ip with respect to the capacitive element Cx. In a normal operation, the switching elements S1, S2 will be opened and closed periodically with a certain leading edge phase-delay (which corresponds to the phase angle delay α) to the zero crossing instants t2, t5 of the phase current Ip. The phase angle delay α which is proportional to a phase-delay time can be a control variable for controlling the resulting capacitance and thus the reactance provided by the variable compensating arrangement CV. After opening the switching element S1, S2, e.g. at the switching time instants t1, t4, the phase current Ip commutates from the series connection of the switching elements S1, S2 to the capacitive element Cx. The voltage $U_{Cx}$ falling across the capacitive element Cx starts to increase until the current zero crossing instant t2, t5 respectively. After the zero crossing instant t2, t5, the voltage $U_{Cx}$ falling across the capacitance Cx decreases until it reaches zero again. At this instant, the phase current Ip commutates from the capacitive element Cx back to the series connection of the switching elements S1, S2. The switch openings, e.g. at the first and the third switching time instant t1, t4, are triggered by a control logic. The switch closings e.g. at the second and the fourth switching instant t2, t5 occurs autonomously due to the diodes D1, D2 placed inside the bidirectional switch arrangement provided by the series connection of the first and the second switching element S1, S2.

Figure 5:
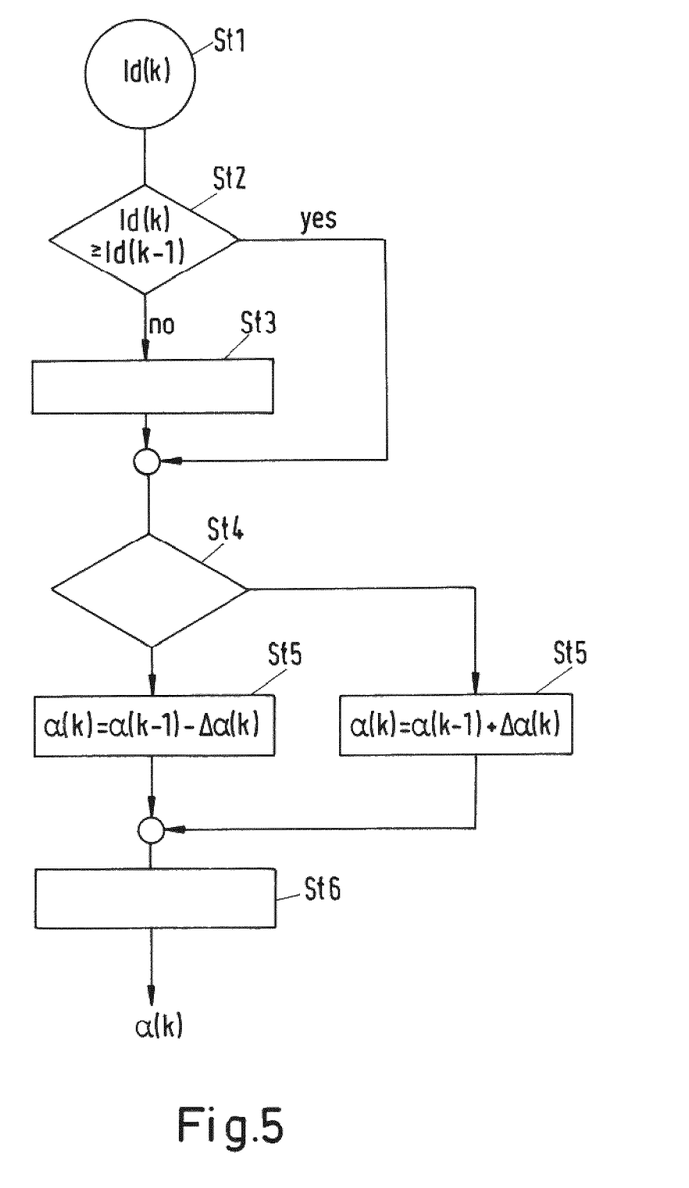

FIG. 5 shows a schematic flow diagram of a hill-climbing approach in order to determine the optimal phase angle delay α(k) for one of the phases. The optimal phase angle delay α(k) is used in order to operate one of the variable compensating arrangements CV1, CV2, CV3, CV (see FIG. 1 or FIG. 3).

In a first step St1 of one cycle of the iteration procedure, the rectified phase current Id(k) is measured. Further, the rectified phase current Id(k) is saved. The rectified phase current Id(k) provides a cost function value at the point in time k. In a second step St2, the rectified phase current Id(k) of the actual cycle is compared to the rectified phase current Id(k−1) which was measured at the first step St1 of the preceding cycle of the iteration procedure. If it is larger than or equal to the rectified phase current Id(k−1) of the last cycle, the search direction remains unchanged. If it is smaller, the search direction is changed, in particular reversed, in a third step St3.

In a fourth step St4, the current search direction is evaluated. If the search direction is directed upwards, e.g. if the search direction is positive, the phase angle delay α(k) of the actual cycle is determined as α(k)=α(k−1)+Δα(k) in a fifth step St5. Alternatively, if the search direction is directed downwards, e.g. if the search direction is negative, the phase angle delay α(k) of the actual cycle is determined as α(k)=α(k−1)−Δα(k) in the fifth step St5.

The absolute value of the delay change Δα(k) of the actual cycle can be constant for all cycles of the iteration procedure.

In a sixth step St6, the value of the phase angle delay α(k) is evaluated and compared to an upper limit and a lower limit. If the phase angle delay α(k) is larger than the upper limit, it can be limited to said upper limit. If the phase angle delay α(k) is smaller than the lower limit, it can be limited to said lower limit.

Finally, the calculated phase angle delay α(k) can be provided to the respective variable compensating arrangement CV1, CV2, CV3, CV or a control unit for controlling the operation of the respective variable compensating arrangement CV1, CV2, CV3, CV.

The invention claimed is:

1. A method of operating a circuit arrangement, wherein the circuit arrangement comprises three phase lines, wherein each phase line comprises at least one field receiving arrangement and at least one compensating arrangement with a variable reactance, wherein at least one current-dependent cost function is evaluated, wherein the reactances of each of the at least one compensating arrangements of the three phase lines are varied such that the at least one current-dependent cost function is optimized, wherein the at least one current-dependent cost function comprises at least one term per phase, wherein the at least one compensating arrangement comprises a capacitive element, wherein each of the at least one compensating arrangements further comprises a first switching element and a second switching element, wherein the first switching element and the second switching element are connected in series, wherein a series connection of the first and the second switching elements is connected in parallel to the capacitive element of the at least one compensating arrangement, and wherein a reference input of the at least one compensating arrangement is a current phase angle delay, wherein the current phase angle delay defines switching times of the first and second switching elements, and wherein the current phase angle delay denotes a difference between a phase angle of a phase current of a phase line before a zero crossing and a phase angle of the phase current of the phase line at the zero crossing, the method comprising:

changing, in one period of the phase current of the phase line of the three phase lines during which the current phase angle changes from 0° to 360°, the second switching element from a conducting state to a non-conducting state before a first zero crossing based on a difference between the phase angle at the first zero crossing and the phase angle of the phase current being equal to a desired current phase angle delay;

changing the first switching element from a non-conducting state to a conducting state at the first zero crossing;

changing, after the first zero crossing, the first switching element from the conducting state to the non-conducting state based on a difference between the phase angle at a second zero crossing and the phase angle of the phase current being equal to the desired current phase angle delay; and changing the second switching element from the non-conducting state to the conducting state at the second zero crossing.

2. The method according to claim 1, wherein at least one reference input of at least one compensating arrangement of at least one phase line is varied such that the at least one current-dependent cost function is optimized.

3. The method according to claim 1, wherein the current-dependent cost function depends on an amplitude of at least one phase current of at least one phase line.

4. The method according to claim 1, wherein the circuit arrangement comprises at least one rectifier for rectifying an alternating output voltage generated by the at least one field receiving arrangement, wherein the current-dependent cost function depends on a rectified phase current or depends on an output power of the at least one rectifier.

5. The method according to claim 1, wherein an optimal reactance of at least one of the at least one compensating arrangements is determined by a one-dimensional optimization method.

6. The method according to claim 5, wherein the one-dimensional optimization method is a hill-climbing optimization method.

7. The method according to claim 1, wherein the current-dependent cost function depends on a sum of amplitudes of all phase currents of the three phase lines.

8. The method according to claim 1, wherein the reactances of each of the at least one compensating arrangements of the three phase lines are varied sequentially.

9. The method according to claim 8, wherein the reactance of at least one compensating arrangement of at least one phase line is varied for a predetermined number of times.

10. The method according to claim 1, wherein the reactance of at least one compensating arrangement of at least one phase line is varied after a predetermined time period after a preceding variation of a reactance.

11. A control system for operating a circuit arrangement, wherein the circuit arrangement comprises three phase lines, wherein each phase line comprises at least one field receiving arrangement and at least one compensating arrangement with a variable reactance, wherein the control system comprises:

at least one control unit, and at least one means for determining at least one parameter depending on a phase current, wherein at least one current-dependent cost function is evaluatable, wherein the reactances of each of the at least one compensating arrangements of the three phase lines are variable such that the at least one current-dependent cost function is optimized, wherein the at least one current-dependent cost function comprises at least one term per phase, wherein the at least one compensating arrangement comprises a capacitive element, wherein each of the at least one compensating arrangements further comprises a first switching element and a second switching element, wherein the first switching element and the second switching element are connected in series, wherein a series connection of the first and the second switching elements is connected in parallel to the capacitive element of the at least one compensating arrangement, and wherein a reference input of the at least one compensating arrangement is a current phase angle delay, wherein the current phase angle delay defines switching times of the first and second switching elements, and wherein the current phase angle delay denotes a difference between a phase angle of a phase current of a phase line before a zero crossing and a phase angle of the phase current of the phase line at the zero crossing;

wherein the at least one control unit is configured to:

change, in one period of the phase current of the phase line of the three phase lines during which the current phase angle changes from 0° to 360°, the second switching element from a conducting state to a non-conducting state before a first zero crossing based on a difference between the phase angle at the first zero crossing and the phase angle of the phase current being equal to a desired current phase angle delay;

change the first switching element from a non-conducting state to a conducting state at the first zero crossing;

change, after the first zero crossing, the first switching element from the conducting state to the non-conducting state based on a difference between the phase angle at a second zero crossing and the phase angle of the phase current being equal to the desired current phase angle delay; and change the second switching element from the non-conducting state to the conducting state at the second zero crossing.

12. The control system of claim 11, further comprising:

at least one rectifier, wherein the at least one current-dependent cost function depends on an output current at terminals of the at least one rectifier or depends on an output power of the at least one rectifier.

13. The control system of claim 12, wherein the at least one rectifier is connected in series to a series connection of the at least one field receiving arrangement and each of the at least one compensating arrangements of the three phase lines of the circuit arrangement.

14. A method of operating a circuit arrangement, wherein the circuit arrangement comprises three phase lines, wherein each phase line comprises at least one field receiving arrangement and at least one compensating arrangement with a variable reactance, wherein at least one current-dependent cost function is evaluated, wherein the reactances of each of the at least one compensating arrangements of the three phase lines are varied such that the at least one current-dependent cost function is optimized, wherein the at least one current-dependent cost function comprises at least one term per phase, and wherein the circuit arrangement comprises at least one rectifier for rectifying an alternating output voltage generated by the at least one field receiving arrangement, wherein the at least one current-dependent cost function depends on an output current at terminals of the at least one rectifier or depends on an output power of the at least one rectifier, wherein the at least one compensating arrangement comprises a capacitive element, wherein each of the at least one compensating arrangements further comprises a first switching element and a second switching element, wherein the first switching element and the second switching element are connected in series, wherein a series connection of the first and the second switching elements is connected in parallel to the capacitive element of the at least one compensating arrangement, and wherein a reference input of the at least one compensating arrangement is a current phase angle delay, wherein the current phase angle delay defines switching times of the first and second switching elements, and wherein the current phase angle delay denotes a difference between a phase angle of a phase current of a phase line before a zero crossing and a phase angle of the phase current of the phase line at the zero crossing, the method comprising:

changing, in one period of the phase current of the phase line of the three phase lines during which the current phase angle changes from 0° to 360°, the second switching element from a conducting state to a non-conducting state before a first zero crossing based on a difference between the phase angle at the first zero crossing and the phase angle of the phase current being equal to a desired current phase angle delay;

changing the first switching element from a non-conducting state to a conducting state at the first zero crossing;

changing, after the first zero crossing, the first switching element from the conducting state to the non-conducting state based on a difference between the phase angle at a second zero crossing and the phase angle of the phase current being equal to the desired current phase angle delay; and changing the second switching element from the non-conducting state to the conducting state at the second zero crossing.

15. The method according to claim 14, wherein the at least one current-dependent cost function depends on the output power of the at least one rectifier, and wherein the output power of the at least one rectifier is calculated based on a product of a DC output voltage of the at least one rectifier and a DC output current of the at least one rectifier.

16. The method according to claim 14, wherein the at least one current-dependent cost function depends on the output current of the at least one rectifier, wherein the output current of the at least one rectifier comprises a rectified phase current, and wherein the rectified phase current depends on a sum of all phase currents of the three phase lines.

17. The method according to claim 14, wherein the reactances of each of the at least one compensating arrangements of the three phase lines are varied based on a phase angle delay of each phase current of the three phase lines; the method further comprising:

controlling the reactances of each of the at least one compensating arrangements of the three phase lines based on a cost function value of the at least one current-dependent cost function that is optimal.

* * * * *